US010471922B2

(12) United States Patent
Hwangbo et al.

(10) Patent No.: US 10,471,922 B2
(45) Date of Patent: Nov. 12, 2019

(54) CURTAIN AIRBAG APPARATUS FOR CAR

(71) Applicant: Hyundai Mobis Co., Ltd., Seoul (KR)

(72) Inventors: SangWon Hwangbo, Goyang-si (KR);
Hae Kwon Park, Yongin-si (KR);
JiWoon Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 63 days.

(21) Appl. No.: 15/689,355

(22) Filed: Aug. 29, 2017

(65) Prior Publication Data
US 2018/0072257 A1    Mar. 15, 2018

(30) Foreign Application Priority Data

Sep. 9, 2016 (KR) .......................... 10-2016-0116455

(51) Int. Cl.
*B60R 21/232* (2011.01)
*B60R 21/213* (2011.01)
*B60R 21/2338* (2011.01)
*B60R 21/233* (2006.01)
*B60R 21/00* (2006.01)

(52) U.S. Cl.
CPC .......... *B60R 21/232* (2013.01); *B60R 21/213* (2013.01); *B60R 21/2338* (2013.01); *B60R 21/233* (2013.01); *B60R 2021/0006* (2013.01); *B60R 2021/23386* (2013.01)

(58) Field of Classification Search
CPC . B60R 21/232; B60R 21/2338; B60R 21/213; B60R 2021/23386; B60R 2021/0006; B60R 21/233
See application file for complete search history.

(56) References Cited

U.S. PATENT DOCUMENTS

| 6,786,505 | B2 * | 9/2004 | Yoshida | B60R 21/233 |
| | | | | 280/729 |
| 9,248,799 | B2 * | 2/2016 | Schneider | B60R 21/205 |
| 9,522,648 | B2 * | 12/2016 | Fukawatase | B60R 21/233 |
| 2016/0059816 | A1 * | 3/2016 | Je | B60R 21/232 |
| | | | | 280/730.2 |
| 2016/0221527 | A1 * | 8/2016 | Sugimori | B60R 21/232 |
| 2017/0008478 | A1 * | 1/2017 | Kim | B60R 21/232 |
| 2017/0253211 | A1 * | 9/2017 | Choi | B60R 21/16 |
| 2018/0099635 | A1 * | 4/2018 | Hioda | B60R 21/232 |
| 2018/0354448 | A1 * | 12/2018 | Moon | B60R 21/233 |
| 2019/0184929 | A1 * | 6/2019 | Ward | B60R 21/232 |

FOREIGN PATENT DOCUMENTS

KR    10-2008-0008109    1/2008

* cited by examiner

*Primary Examiner* — Karen Beck
(74) *Attorney, Agent, or Firm* — H.C. Park & Associates, PLC (57) ABSTRACT

A curtain airbag apparatus for a car includes: a cushion part installed in a car body, and configured to be deployed between the car body and a passenger by a gas supplied through an inflator; a tether part formed between the cushion part and the car body, and formed to have both sides connected to the cushion part so as to guide a deployment shape of the cushion part; and a bending guide part configured to form a groove at a side surface of the cushion part such that gas is not supplied to the groove, and configured to guide the cushion part to have a concave shape toward the car body.

9 Claims, 7 Drawing Sheets

CURTAIN AIRBAG APPARATUS FOR CAR

CROSS-REFERENCES TO RELATED APPLICATIONS

The present application claims priority to Korean application number 10-2016-0116455, filed on Sep. 9, 2016, which is incorporated by reference in its entirety.

BACKGROUND OF THE INVENTION

The present invention relates to a curtain airbag apparatus for a car, and more particularly, to a curtain airbag apparatus for a car, which is capable of preventing floating of an airbag deployed between a passenger and a sidewall of the car.

In general, an airbag is installed at the center of a steering wheel or in a crash pad in front of a passenger's seat, and serves to protect the upper bodies and faces of a driver and a passenger in case of a collision accident. In order to maximize the passenger protection effect by the airbag, another airbag is also installed at the side of the seat or a roof side rail, and protects the passenger from a shock applied by a lateral collision or oblique collision.

Among the airbags, the airbag installed in the roof side rail is referred to as a curtain airbag. The reason why the airbag is referred to as the curtain airbag is that the curtain airbag has the shape of a curtain installed on a window to cover door glass, when completely deployed downward from the roof side rail.

When a collision accident occurs, a control unit recognizing the collision accident through a shock sensor triggers an inflator. Then, the inflator generates gas, and the generated gas is introduced into a cushion of the curtain airbag apparatus. Therefore, the cushion of the curtain airbag apparatus is deployed to protect a passenger.

Since a conventional curtain airbag apparatus for a commercial vehicle has a larger vertical length than a curtain airbag apparatus for a car, the conventional curtain airbag apparatus tends to excessively loosen. Therefore, there is a demand for a structure capable of solving the problem.

The related art is disclosed in Korean Patent Publication No. 2008-0008109 published on Jan. 23, 2008 and entitled "Cushion of curtain airbag apparatus".

SUMMARY OF THE INVENTION

Embodiments of the present invention are directed to a curtain airbag apparatus for a car, which is capable of preventing floating of an airbag deployed between a passenger and a sidewall of the car.

In one embodiment, a curtain airbag apparatus for a car may include: a cushion part installed in a car body, and configured to be deployed between the car body and a passenger by gas supplied through an inflator; a tether part formed between the cushion part and the car body, and formed to have both sides connected to the cushion part so as to guide a deployment shape of the cushion part; and a bending guide part configured to form a groove at a side surface of the cushion part such that a gas is not supplied to the groove, and configured to guide the cushion part to have a concave shape toward the car body.

The cushion part may include: a cushion body configured to expand by the gas supplied through the inflator; and a pattern part configured to form a region in the cushion body such that the gas is not supplied to the region, the pattern part being connected to both sides of the tether part.

The cushion body may be configured to be deployed between a front pillar and a side pillar, and configured to be expanded in a shape to cover a window of a door installed at a sidewall of the car body.

The pattern part may be configured to extend in a top-to-bottom direction of the cushion body while forming a looped curve in the cushion body, and include a first connection part to which the top of the tether part is connected and a second connection part to which the bottom of the tether part is connected.

The length of the cushion part may be more than the length of the tether part between the first and second connection parts through which the cushion part and the tether part are connected to each other by sewing, and the cushion part configured to be folded and stored.

The pattern part may include: a first pattern disposed in a region in the cushion body facing the bending guide part; a second pattern disposed in a region in the cushion body next to the first pattern; and a third pattern disposed in a region in the cushion body next to the second pattern, and configured to form a looped curve.

The first connection part may be located at the top of the first pattern, and the second connection part is located at the bottom of the first pattern.

The tether part may be formed in a string shape, and the length of the tether part connected to the first and second connection parts may be less than a distance between the first and second connection parts.

The cushion body may be configured to be deployed in a concave shape toward the car body.

The bending guide part may be located at a side surface of the cushion body facing a side pillar, and the tether part may be connected to the first connection part and the second connection part facing the bending guide part.

A first bending boundary line may be formed between the bending guide part and the first pattern, and the cushion body located at the top and bottom of the first bending boundary line may be bent toward the car body.

The top of the tether part may be sewed to the inside of the pattern part located at the top of the lower portion of the cushion part, and the bottom of the tether part is sewed to the inside of the pattern part located at the bottom of the lower portion of the cushion part.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
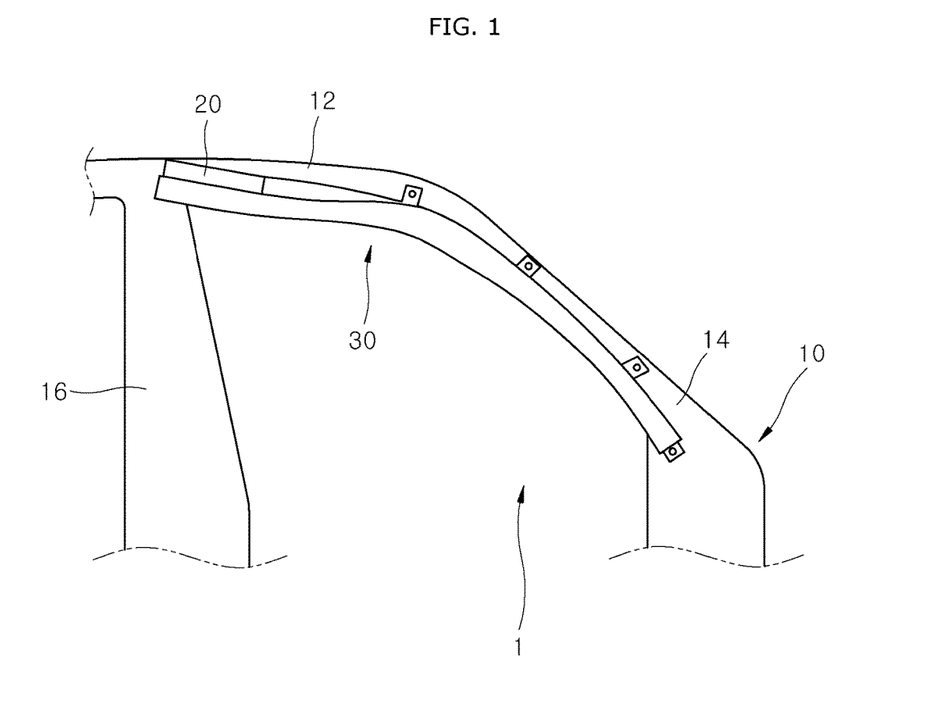
FIG. 1 schematically illustrates a state before a curtain airbag apparatus for a car in accordance with an embodiment of the present invention is operated.
Figure 2:
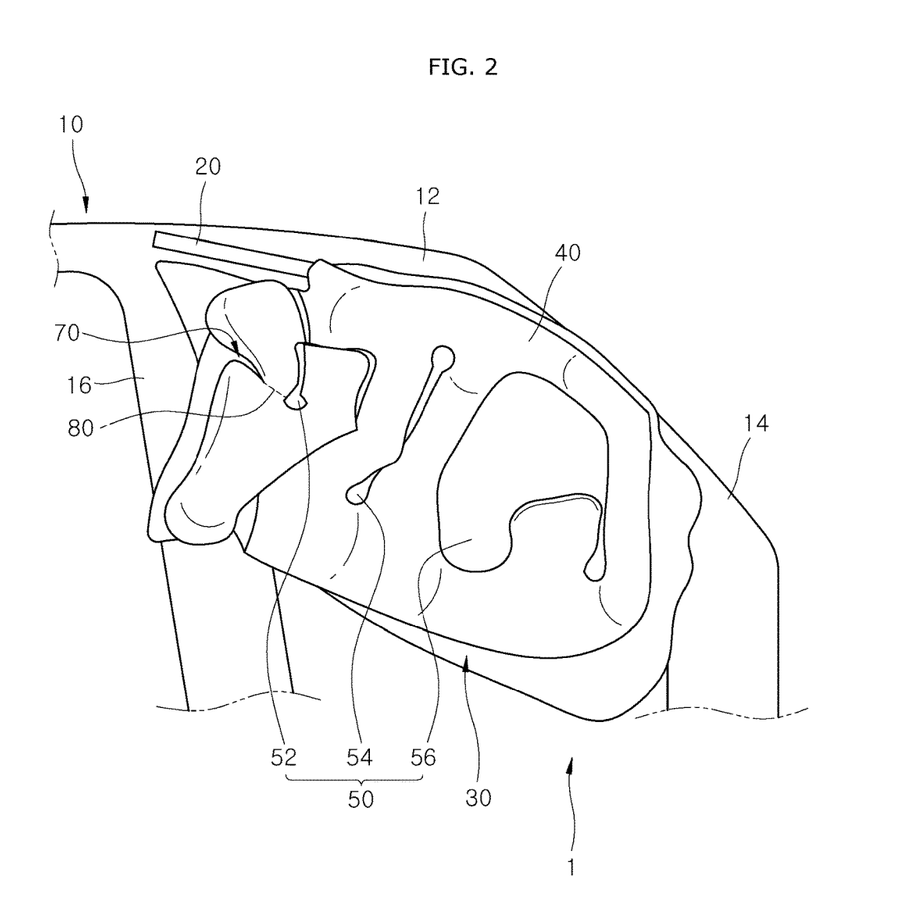
FIG. 2 schematically illustrates a state in which the curtain airbag apparatus for a car in accordance with the embodiment of the present invention is operated.
Figure 3:
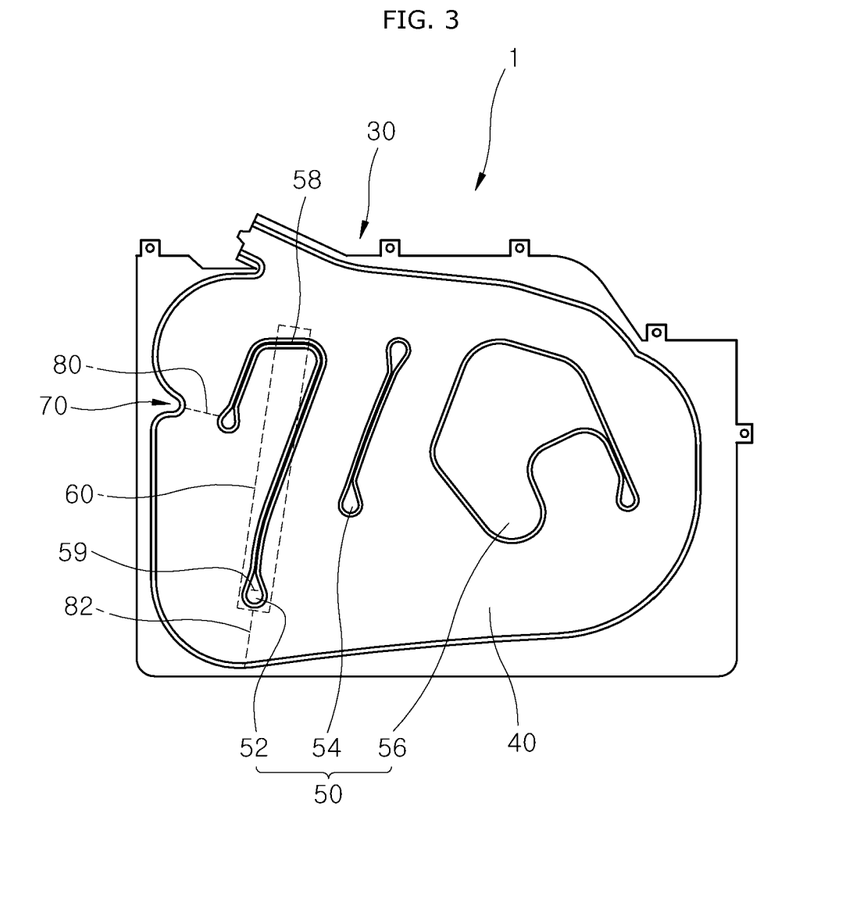
FIG. 3 is a front view of the curtain airbag apparatus for a car in accordance with the embodiment of the present invention.
Figure 4:
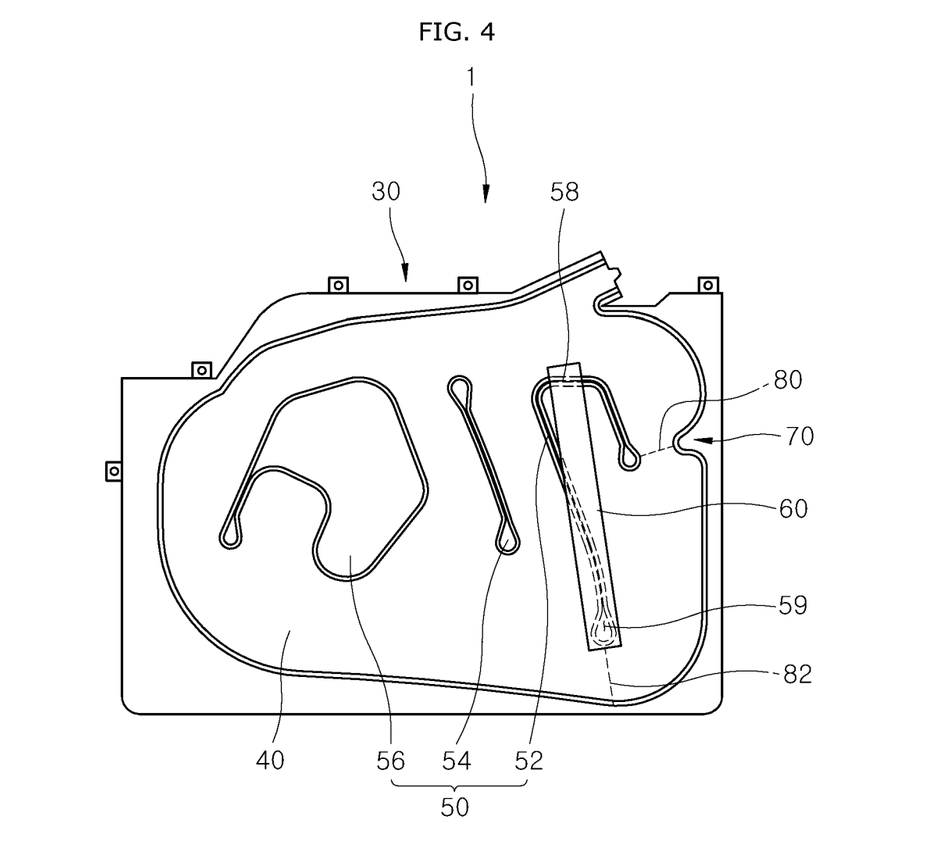
FIG. 4 is a rear view of the curtain airbag apparatus for a car in accordance with the embodiment of the present invention.
Figure 5:
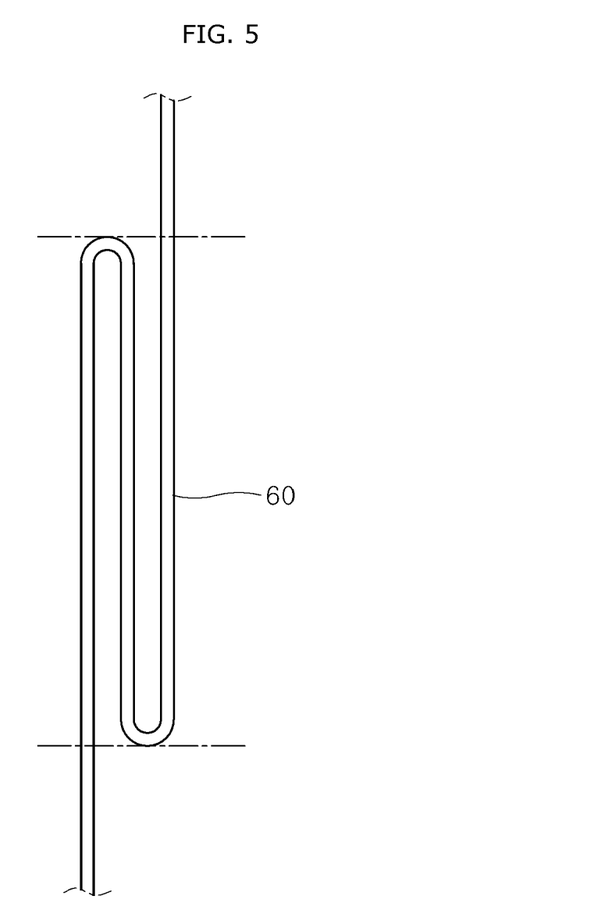
FIG. 5 illustrates a cushion part in accordance with the embodiment of the present invention.
Figure 6:
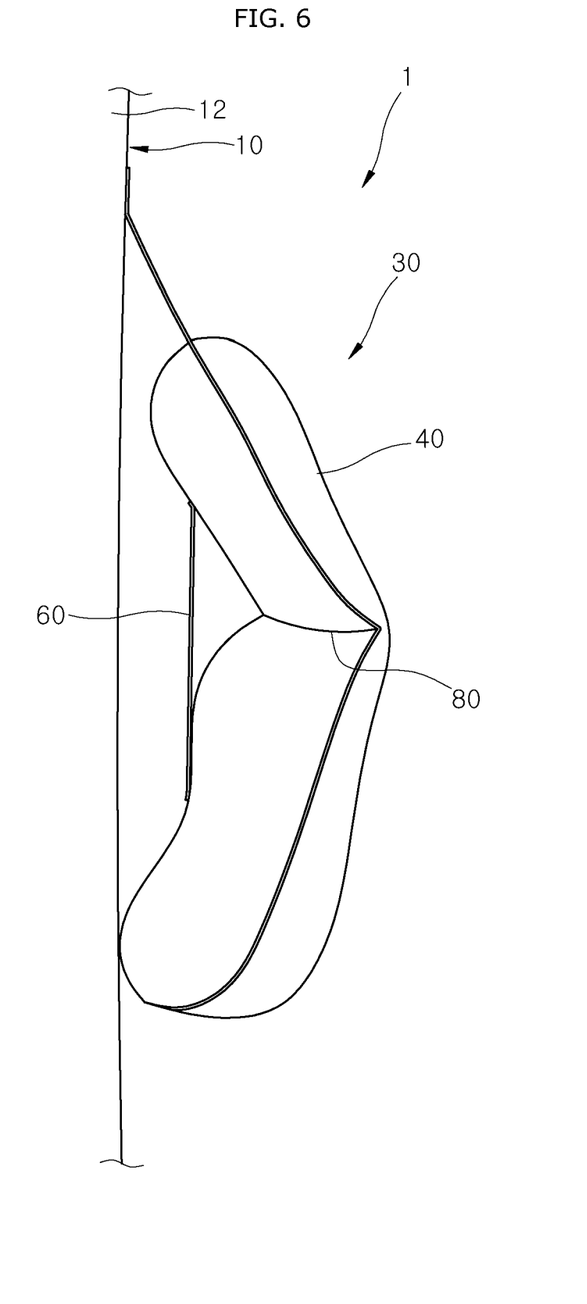
FIG. 6 is a side view illustrating a state in which the curtain airbag apparatus for a car in accordance with the embodiment of the present invention is operated.
Figure 7:
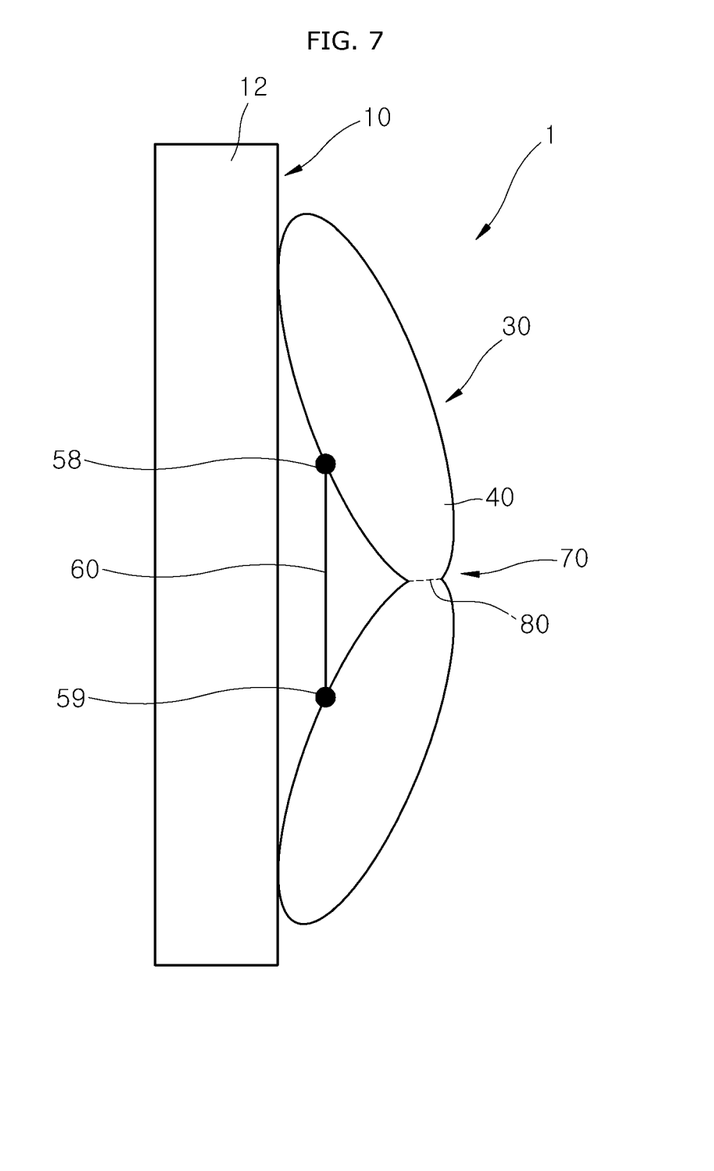
FIG. 7 is a schematic side view illustrating a state before a curtain airbag apparatus for a car in accordance with the embodiment of the present invention is operated.

FIG. 1 schematically illustrates a state before a curtain airbag apparatus for a car in accordance with an embodiment of the present invention is operated, FIG. 2 schematically illustrates a state in which the curtain airbag apparatus for a car in accordance with the embodiment of the present invention is operated, FIG. 3 is a front view of the curtain airbag apparatus for a car in accordance with the embodiment of the present invention, FIG. 4 is a rear view of the curtain airbag apparatus for a car in accordance with the embodiment of the present invention, FIG. 5 illustrates a cushion part in accordance with the embodiment of the present invention, FIG. 6 is a side view illustrating a state in which the curtain airbag apparatus for a car in accordance with the embodiment of the present invention is operated, and FIG. 7 is a schematic side view illustrating a state before a curtain airbag apparatus for a car in accordance with the embodiment of the present invention is operated.

As illustrated in FIGS. 1, 2, and 3, the curtain airbag apparatus 1 in accordance with the embodiment of the present invention may include a cushion part 30, a tether part 60 and a bending guide part 70. The cushion part 30 may be installed in a car body 10 and deployed between the car body 10 and a passenger by gas supplied through an inflator 20, the tether part 60 may be formed between the cushion part 30 and the car body 10, and formed to have both sides connected to the cushion part 30 so as to guide a deployment shape of the cushion part 30, and the bending guide part 70 may form a groove at a side surface of the cushion part 30, to which gas is not supplied, and guide the cushion part 30 to have a concave shape toward the car body 10.

The curtain airbag apparatus 1 for a car may be installed at the top of a sidewall 12 of the car body 10. In case of a collision accident, the curtain airbag apparatus 1 may deploy a cushion downward from the top of the car body 10, and thus reduce an injury accident which occurs when a passenger comes in contact with the sidewall 12 of the car body 10. The sidewall 12 of the car body 10 may have a door through which the passenger can get on or off, and the door may include a door window. Therefore, when the passenger bumps against the sidewall 12 including the door window in case of a vehicle accident, an injury of the passenger may be increased. Therefore, the curtain airbag apparatus 1 for a car may be deployed between the passenger and the sidewall 12 of the car body 10, in order to reduce the injury of the passenger.

A pillar refers to a column of the car body 10. The pillar may be disposed between a door and the ceiling, and raise the strength of the car body. A pillar between a front window and a side window may be referred to as a front pillar 14 or A pillar, and a pillar between front and rear doors may be referred to as a side pillar or B pillar.

The inflator 20 may be installed in the car body 10 with the cushion part 30, and supply high-pressure gas toward the cushion part 30 in case of an accident.

The cushion part 30 may include various types of cushion devices as long as they can be installed in the car body 10 and deployed between the car body 10 and a passenger by gas supplied through the inflator 20 so as to reduce an injury of the passenger. The cushion part 30 in accordance with the embodiment of the present invention may include a cushion body 40 and a pattern part 50. The cushion body 40 may be expanded by the gas supplied through the inflator 20, and the pattern part 50 may be connected to both sides of the tether part 60, and form a region in the cushion body 40, to which gas is not supplied.

The cushion body 40 may have various shapes as long as the cushion body 40 can be expanded by the supply of gas and form a buffer space for absorbing a shock between the car body 10 and the passenger. The cushion body 40 in accordance with the present embodiment may be deployed between the front pillar 14 and the side pillar 16 of the car, and expanded in a shape to cover the window of the door installed at the sidewall 12 of the car body 10.

As illustrated in FIGS. 4 and 5, the cushion part 30 may be folded and stored in such a manner that the length of the cushion part 30 becomes more than the length of the tether part 60 between first and second connection parts 58 and 59 through which the cushion part 30 and the tether part 60 are connected to each other by sewing. The reason why the cushion part 30 is folded and stored is in order to not only store the cushion part 30 without wrinkling, but also deploy the cushion part 30 evenly in case of an accident. For this operation, the cushion part 30 may be folded in a zigzag shape.

As illustrated in FIGS. 3 and 4, the pattern part 50 in accordance with the present embodiment may be extended in the top-to-bottom direction of the cushion body 40 while forming a looped curve in the cushion body 40, and include the first connection part 58 to which the top of the tether part 60 is connected and the second connection part 59 to which the bottom of the tether part 60 is connected.

The pattern part 50 may be disposed in the cushion body 40, and form a looped curve-shaped pattern in the cushion body 40, to which gas is not supplied. The pattern part 50 may include a first pattern 52, a second pattern 54 and a third pattern 56. At this time, the shapes, locations and numbers of the patterns may be decided in consideration of a body part of the passenger, to which a shock is applied.

The first pattern 52 may be installed at a location facing the bending guide part 70, while forming a looped curve in the shape of "7". The first connection part 58 may be located at the top of the first pattern 52, and the second connection part 59 may be located at the bottom of the first pattern 52.

The "1"-shaped second pattern 54 may be located at the side of the first pattern 52, and the third pattern 56 forming a looped curve may be located at the side of the second pattern 54. The locations and shapes of the first to third patterns 52 to 56 may be changed depending on the shape and size of the cushion body 40.

As illustrated in FIGS. 3, 4, 5, 6 and 7, the tether part 60 may be located between the cushion part 30 and the car body 10, and have both sides connected to the cushion part 30 so as to control the deployment shape of the cushion part 30. The tether part 60 in accordance with the present embodiment may have a string shape, and the length of the tether part 60 connected to the first and second connection parts 58 and 59 may be less than a distance between the first and second connection parts 58 and 59. That is, since the length of the tether part 60 is less than the distance between the first and second connection parts 58 and 59, the cushion part 30 may be bent by the tether part 60 when the cushion part 30 is deployed.

Therefore, the cushion body 40 may be deployed in a concave shape toward the car body 10, thereby preventing the cushion part 30 from floating toward the outside of the car body 10.

In the present embodiment, the tether part 60 may be made of cotton, and fixed to the first and second connection parts 58 and 59 through sewing. The top of the tether part 60 may be sewed to the inside of the pattern part 50 located at the top of the lower portion of the cushion part 30, and the bottom of the tether part 60 may be sewed to the inside of the pattern part 50 located at the bottom of the lower portion of the cushion part 30. Therefore, since the tether part is not sewed to the cushion body 40 to which gas is supplied, it is possible to block the possibility that gas will leak to the outside of the cushion part 30, thereby improving the operation reliability of the cushion part 30.

The bending guide part 70 may form a groove at the side of the cushion part 30, to which gas is not supplied, and guide the cushion part 30 have a concave shape toward the car body 10. That is, the bending guide part 70 may form the groove at the side of the central portion of the cushion body 40 facing the pattern part 50. Since the bending guide part 70 forms the groove which is concave toward the inside of the cushion body 40 from the edge of the cushion body 40, the portion of the cushion body 40, facing the bending guide part 70, may have a lower strength than the other portions of the cushion body 40. Therefore, when the cushion part 30 is deployed, the cushion body 40 may be bent about the bending guide part 70.

The bending guide part 70 in accordance with the present embodiment may be disposed at the side of the cushion body 40 facing the side pillar 16, and the tether part 60 may be connected to the first connection part 58 and the second connection part 59 facing the bending guide part 70. Thus, the first connection part 58 located at the top of the first pattern 52 and the second connection part 59 located at the bottom of the first pattern 52 may be bent about the bending guide part 70. Therefore, the cushion body 40 may be bent in a concave shape toward the car body 10, and a first bending boundary line 80 may be formed between the bending guide part 70 and the first pattern 52. The cushion body 40 may protrude in the direction that the first bending boundary line 80 faces the passenger, and the cushion body 40 located at the top and bottom of the first bending boundary line 80 may be bent toward the car body 10.

Furthermore, the cushion body 40 may be bent based on a second bending boundary line 82 connecting the second connection part 59 of the pattern part 50 to the bottom of the cushion body 40. The left and right sides of the cushion body 40 based on the second bending boundary line 82 may protrude forward, and a portion of the cushion body 40, where the second bending boundary line 82 is located, may protrude toward the car body 10.

Hereafter, the operation of the curtain airbag apparatus 1 for a car in accordance with the embodiment of the present invention will be described in detail with reference to the accompanying drawings.

As illustrated in FIG. 1, the curtain airbag apparatus 1 for a car may be installed in the car body 10 at normal times.

When a shock is applied to the car body 10 as illustrated in FIGS. 2, 3, and 4, gas may be supplied to the cushion body 40 of the cushion part 30, and deploy the cushion between the passenger and the sidewall 12 of the car body 10. The cushion part 30 to which the gas is supplied may be deployed downward from the top of the car body 10.

At this time, since the tether part 60 having a less length than the cushion part 30 controls the expansion direction of the cushion part 30, the cushion part 30 may be bent about the first bending boundary line 80, and the top and bottom of the cushion body 40 may be bent toward the car body 10.

That is, since the amount of gas injected to a portion of the cushion body 40, located between the pattern part 50 and the bending guide part 70 where the first bending boundary line 80 is formed, is less than the amount of gas injected to the other portions of the cushion body 40, the corresponding portion may have low strength when the cushion body 40 is deployed. Therefore, when the tether part 60 pulls the rear of the cushion part 30, the cushion part 30 may be bent about the first bending boundary line 80.

Furthermore, the amount of gas injected to a portion of the cushion body 40, located between the bottom of the cushion body 40 and the bottom of the pattern part 50 where the second bending boundary line 82 is formed, may be less than the amount of gas injected to the other portions of the cushion body 40. Thus, when the cushion part 30 is deployed, the corresponding portion may have low strength. Therefore, when the tether part 60 pulls the rear of the cushion part 30, the cushion part 30 may be bent about the second bending boundary line 82.

The cushion body 40 may be not only convexly bent about the first bending boundary line 80 in the direction facing the passenger, but also convexly bent about the second bending boundary line 82 in the direction facing the car body 10.

In order to set the bent portion of the cushion part 30, the bending guide part 70 and the first pattern 52 of the pattern part 50 may be formed at the portion which is to be bent. The bending guide part 70 may form a groove at the edge line of the region where the cushion part 30 is expanded, such that the corresponding portion of the cushion body 40 has a less thickness than the other portions of the cushion body 40. Since the corresponding portion of the cushion body 40 has a less thickness than the other portions of the cushion body 40, the corresponding portion may have relatively low strength. Thus, the cushion part 30 may be bent about the first bending boundary line 80.

The shape and location of the bending guide part 70 and the shape and location of the pattern part 50 may be changed depending on the location of the bent portion.

Furthermore, if necessary, a plurality of tether parts 60 may be installed and connected to the cushion part 30 so as to guide the deployment of the cushion part 30. In this case, the cushion body 40 may be located between the car body 10 and the passenger, thereby reducing an occurrence of safety accident.

As described above, since the lower portion of the cushion part 30, which may float, is expanded toward the car body 10 by the guide of the tether part 60, floating of the airbag can be prevented to reduce an injury of the passenger. Furthermore, since the cushion part 30 is bent toward the car body 10 about the bending guide part 70 having relatively low strength, the top and bottom of the cushion part 30 can maintain the shape that comes in contact with the car body 10, which makes it possible to prevent floating of the airbag.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A curtain airbag apparatus for a car, comprising:
a cushion part installed in a car body, and configured to be deployed between the car body and a passenger by a gas supplied through an inflator;
a tether part formed between the cushion part and the car body, and formed to have a side and another side thereof connected to the cushion part so as to guide a deployment shape of the cushion part; and
a bending guide part configured to form a groove at a side surface of the cushion part such that the gas is not supplied to the groove, and configured to guide the cushion part to have a concave shape toward the car body;
wherein the cushion part comprises:
a cushion body configured to expand by the gas supplied through the inflator; and
a pattern part configured to form a region in the cushion body such that the gas is not supplied to the region, the pattern part being connected to both sides of the tether part, where in the pattern part is disposed away from the bending guide part;
wherein the pattern part is configured to extend in a top-to-bottom direction of the cushion body while forming a looped curve in the cushion body, and comprises a first connection part to which the top of the tether part is connected and a second connection part to which the bottom of the tether part is connected.

2. The curtain airbag apparatus of claim 1, wherein the cushion body is configured to be deployed between a front pillar and a side pillar of a car, and configured to be expanded in a shape to cover a window of a door installed at a sidewall of the car body.

3. The curtain airbag apparatus of claim 1, wherein the length of the cushion part is more than the length of the tether part between the first and second connection parts through which the cushion part and the tether part are connected to each other by sewing, and the cushion part is configured to be folded and stored.

4. The curtain airbag apparatus of claim 1, wherein the pattern part comprises:
a first pattern disposed in a region in the cushion body facing the bending guide part;
a second pattern disposed in a region in the cushion body next to the first pattern; and
a third pattern disposed in a region in the cushion body next to the second pattern, and configured to form a looped curve.

5. The curtain airbag apparatus of claim 4, wherein the first connection part is located at the top of the first pattern, and the second connection part is located at the bottom of the first pattern.

6. The curtain airbag apparatus of claim 1, wherein the tether part is formed in a string shape, and the length of the tether part connected to the first and second connection parts is less than a distance between the first and second connection parts.

7. The curtain airbag apparatus of claim 6, wherein the cushion body is configured to be deployed in a concave shape toward the car body.

8. The curtain airbag apparatus of claim 7, wherein the bending guide part is located at a side surface of the cushion body facing a side pillar, and the tether part is connected to the first connection part and the second connection part facing the bending guide part.

9. The curtain airbag apparatus of claim 8, wherein a first bending boundary line is formed between the bending guide part and the first pattern, and the cushion body located at the top and bottom of the first bending boundary line is bent toward the car body.

* * * * *